United States Patent
Diefendorff et al.

(10) Patent No.: US 6,202,141 B1
(45) Date of Patent: Mar. 13, 2001

(54) METHOD AND APPARATUS FOR PERFORMING VECTOR OPERATION USING SEPARATE MULTIPLICATION ON ODD AND EVEN DATA ELEMENTS OF SOURCE VECTORS

(75) Inventors: Keith Everett Diefendorff, Los Gatos, CA (US); Pradeep Kumar Dubey, White Plains, NY (US); Ronald Ray Hochsprung, Los Gatos, CA (US); Brett Olsson, Cary, NC (US); Hunter Ledbetter Scales, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/098,063

(22) Filed: Jun. 16, 1998

(51) Int. Cl.$^7$ ................................................. G06F 9/302
(52) U.S. Cl. ........................................ 712/9; 712/5; 712/8
(58) Field of Search ................................. 712/5, 8, 22, 9; 395/706

(56) References Cited

U.S. PATENT DOCUMENTS 5,251,323 * 10/1993 Isobe ........................................ 712/5
5,678,058 * 10/1997 Sato ........................................ 712/5
5,933,650 * 8/1999 van Hook et al. ....................... 712/2

OTHER PUBLICATIONS

"VIS Instruction Set User's Manual", Sun Microsystems, Inc., Jul. 1997.

"MIPS Digital Media Extension", Silicon Graphics, Inc.

Craig Hansen, "Architecture of a Broadband Mediaprocessor", COMPCON96, Feb. 25–29, 1996.

"Appendix A, IA MMX Instruction Set Summary" and "Intel Architecture MMX Instruction Set" Intel Corporation, May 20, 1998.

"64–bit and Multimedia Extensions in the PA–RISC 2.0 Architecture", Hewlett Packard, May 20, 1998.

Millind Mittal et al., "MMX Technology Architecture Overview", Intel Technology Journal Q3 '97.

* cited by examiner

*Primary Examiner*—Kenneth S. Kim
(74) *Attorney, Agent, or Firm*—F. Chau & Associates, LLP (57) ABSTRACT

A vector multiplication mechanism is provided that partitions vector multiplication operation into even and odd paths. In an odd path, odd data elements of first and second source vectors are selected, and multiplication operation is performed between each of the selected odd data elements of the first source vector and corresponding one of the selected odd data elements of the second source vector. In an even path, even data elements of the source vectors are selected, and multiplication operation is performed between each of the selected even data elements of the first source vector and corresponding one of the selected even data elements of the second source vector. Elements of resultant data of the two paths are merged together in a merge operation. The vector multiplication mechanism of the present invention preferably uses a single general-purpose register to store the resultant data of the odd path and the even path. In addition, computational overhead of the merge operation is amortized over a series of vector operations.

48 Claims, 5 Drawing Sheets

DATA ELEMENTS

FIG. 6

METHOD AND APPARATUS FOR PERFORMING VECTOR OPERATION USING SEPARATE MULTIPLICATION ON ODD AND EVEN DATA ELEMENTS OF SOURCE VECTORS

BACKGROUND OF THE INVENTION

1. Technical Field

This invention relates to computer processing systems, and, in particular, vector multiplication operations performed by computer processing systems.

2. Related Art

Partial multiplication of an integer x-bits wide with another integer y-bits wide generates a result less than (x+y) bits wide, which typically represents the high order half (or low order half) of the full multiplication operation of the two integers. A vector multiplication operation may utilize partial multiplication by defining multiplication primitives that perform a partial multiplication operation on elements of partitioned source vectors to a produce a resultant vector. Prior art implementations have used such partial multiplication operations. For example, the VISTM instruction set extension to the SPARC-V9™ architecture developed by SUN Microsystems, Inc. includes a series of vis_fmul8×16 instructions that perform a partial multiplication operation on elements of partitioned source vectors to a produce a resultant vector. The elements of partitioned source vectors that are multiplied together vary based upon the particular vis_fmul8×16 instruction. A more detailed description of the series of vis_fmul8×16 vector multiplication operations that make up the VIS™ instruction set is set forth in "VIS™ Instruction Set User's Manual", Sun Microsystems, Inc., 1997, pp. 54–64.

Full multiplication of an integer x-bits wide with another integer y-bits wide generates a result (x+y) bits wide. A vector multiplication operation may utilize full multiplication by defining multiplication primitives that perform a full multiplication operation on elements of partitioned source vectors to a produce a resultant vector. Prior art implementations that use such full multiplication operations may be placed into one of two categories: Accumulator-based, and Register-pair Destination.

In an Accumulator-based implementation, the result of the full multiplication operation on the elements of the partitioned source vectors is written to a non-general purpose register, named accumulator, of wider width than the general purpose registers. For example, the Digital Media Extension (MDMX) extension to the MIPS architecture developed by Silicon Graphics Inc. includes an MULA instruction that multiplies together elements of two source vectors and writes the result to a private 192-bit Accumulator register (which cannot be directly loaded from or stored to main memory, but must be staged though a FP register file). A more detailed description of the MULA vector multiplication operation in the MDMX extension set is set forth in "MIPS Digital Media Extension", Silicon Graphics, Inc., pp. C-18.

In a Register-pair Destination implementation, the result of the full multiplication operation on the elements of the partitioned source vectors is written to a pair of general purpose registers. For example, the instruction set architecture of the broadband processor developed by MicroUnity Systems Engineering, Inc. includes a g.mult.32 instruction that multiplies together the corresponding symbols in two 64-bit registers and writes the result to two 64-bit registers. A more detailed description of the g.mult.32 instruction is set forth in "Architecture of a Boradband MediaProcessor", MIPS Digital Media Extension", MicroUnity Systems Engineering, Inc., 1996, which was presented at COMPSCON96, Feb. 25–29, 1996.

There are significant limitations that pertain to each of the prior art implementations discussed above in performing a full multiplication operation on elements of two or more source vectors. First, implementations that perform vector multiplication operation utilizing partial multiplication require significant computational overhead to piece together the partial multiplication results to generate the results of the full multiplication operation. Second, the Accumulator-based implementations are inflexible due to the fact that there is a very limited number (typically one or two) non-general purpose accumulator registers that may be used to store the results of the vector multiplication operation, which restricts the number of vector multiplication operations that can be concurrently performed by the processor. Finally, Register-pair Destination implementations complicate the run-time dispatch operation (i.e., register renaming operation) of instructions due to the fact that such implementation write the results of the vector multiplication operations to two or more registers.

Thus, there is a need in the art to provide an efficient and flexible mechanism for performing a full multiplication operation on the elements of two or more source vectors.

SUMMARY OF THE INVENTION

The above-stated problems and related problems of the prior art are solved with the principles of the present invention, method and apparatus for performing vector multiplication by splitting multiplication operation among odd and even data elements. The present invention partitions a vector multiplication operation into an even and odd path. In the odd path, the odd data elements of the source vectors are selected, and a full multiplication operation is performed on the selected odd data elements. In the even path, the even data elements of the source vectors are selected, and a full multiplication operation is performed on the selected even data elements. The results of the two paths are merged together with a merge operation. The vector multiplication mechanism of the present invention preferably uses a single general purpose register to store each result of the odd and even vector multiplication operations. In addition, the computational overhead of the merge operation may be amortized over a series of vector operations.

DETAILED DESCRIPTION OF THE PREFERRED EMBODIMENTS

Figure 1:
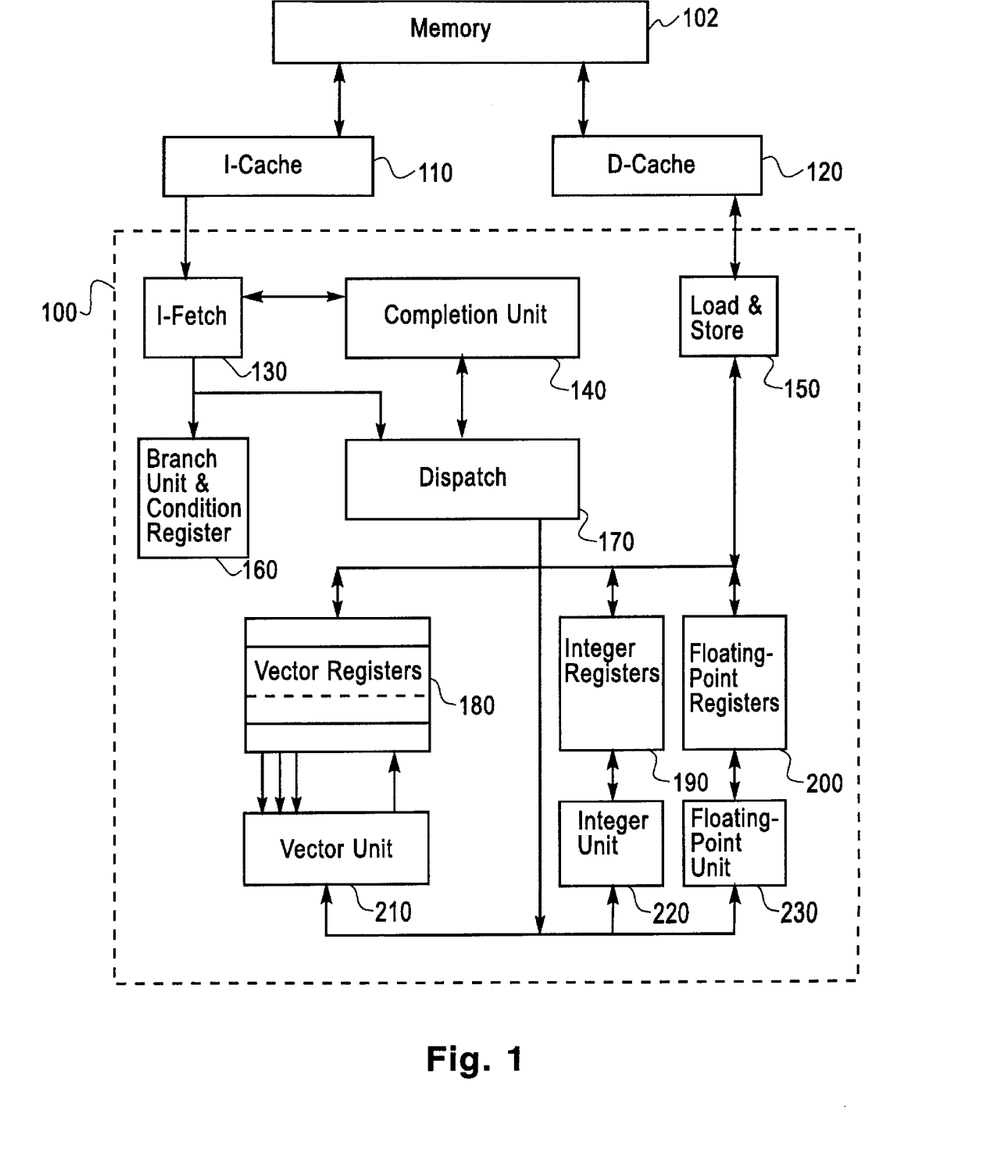
FIG. 1 is a functional block diagram of a processing system in which the present invention is embodied.

FIG. 1 is a functional block diagram illustrating a processing system wherein the present invention is embodied.

The processing system includes a processor unit 100 and an associated memory unit 102. The memory unit 102 holds program data and instructions to be executed on the processor unit 100. As is conventional, the memory unit 102 is interfaced with an instruction cache unit 110 and a data cache unit 120 such that frequently used instruction and data portions of the memory unit 102 are kept in an instruction cache unit 110 and data cache unit 120, respectively. Alternatively, the instruction and data cache units 110,120 may be merged into a single unified cache. Access time for the cache units 110, 120 are typically much smaller than that of the memory unit 102. The instruction cache and/or data cache units 110,120 may also be comprised of multiple caches or multilevel caches as is also well known.

Typically, the instructions/data stored in the instruction cache 110 and data cache 120, respectively, are divided into lines (typically referred to as blocks). An instruction fetch unit 130 fetches one or more blocks of instructions stored in the instruction cache 110, forwards branch instructions and condition register update instructions to a branch unit 160 for execution, and forwards sequential (non-branch instructions) to a dispatch unit 170. The dispatch unit 170 analyses dependencies among pending instructions, and schedules execution of instructions on one or more functional units. The functional units may be symmetric, where each functional unit is capable of executing all types of sequential instructions. In the alternative, the functional units may be asymmetric, where a specific unit is capable of executing only certain subset of sequential instructions. The functional units receive input source operands from and write the output results to one or more register files and/or the data cache unit 120. The register file(s) provides operands to the functional units for executing instructions and also receives results of execution. The set(s) is further broken down into architecturally visible set of registers and architecturally invisible registers. Architecturally visible, or architected registers, refer to the fixed set of registers that are accessible to the assembly level programmer (or the compiler) of the machine. The functional units may execute instructions out-of-sequential-order. In such a system, the register file(s) typically utilizes register rename buffers and register renaming techniques to store the operands used by the functional units in executing the instructions and the results produced by the functional units. Such a register file is well known in prior art.

A load/store unit 150 handles fetching and writing of blocks of data from/to the data cache 120 to the functional units as needed. The data cache unit 120 holds data values used as source operands by the instructions and some of the data values generated by executed instructions. Since multiple memory-resident data values may be simultaneously required by the functional units and multiple memory-bound results may be simultaneously generated, the data cache unit 120 is typically multi-ported.

The processor unit 100 also includes a completion unit 140 responsible for completing instruction execution in an order considered a valid order by the architecture. Even though the functional units may execute instructions out-of-order, the processor unit 100 may or may not be allowed to complete the instructions in the same order, depending on the architectural constraints.

The branch unit 160 predicts unresolved branches, and determines the validity of each prediction on branch resolution. The branch unit 160 also includes a condition register, which is used for evaluating the outcome of conditional branches, and logic that updates the condition register according to the results of operations performed by the functional units.

In the preferred embodiment, the functional units may be asymmetric, where a specific unit is capable of executing only certain subset of sequential instructions. In this case, the register file is typically partitioned logically into subsets corresponding to the functionality of the functional units. Note that the logical partitioning of the register file may be architecturally visible or invisible. Moreover, the register files may be logically separate yet physically share common circuitry. In addition, the dispatch unit 170 must be aware of this asymmetry and schedule the instructions appropriately.

An exemplary asymmetric system is shown in FIG. 1. The functional units include one or more fixed point units 220 (one shown) for performing fixed-point operations, one or more floating-point units 230 (one shown) for performing floating-point operations), and one or more vector units 210 (one shown) for performing vector operations on one or more source vectors. The fixed-point operations performed by the fixed point units 220 may include fixed-point addition, fixed-point subtraction, fixed-point multiplication, fixed-point division, AND, OR, XOR, fixed-point compare, fixed-point rotate, and fixed-point shift operations. The floating-point operations performed by the floating-point units 230 may include floating-point addition, floating-point substraction, floating-point multiplication, floating-point division and floating point compare operations. The vector operations performed by the vector units 210 characteristically have an inherent high degree of parallelism. Preferably, such vector operations are SIMD-style operations wherein an instruction performs the same operation on a multiple data elements within the source vectors. The fixed-point unit(s) 220 receive input source operands from and write the output results to a fixed-point register file 190 and/or the data cache unit 120. The floating point unit(s) 230 receive input source operands from and write the output results to a floating point register file 200 and/or the data cache unit 120. The vector unit 210 receives input vectors from and write the output results to a vector register file 180 and/or the data cache unit 120. Note the fixed-point register file 190, the floating-point register file 200 and the vector register file 180 may be architecturally visible or invisible and, in addition, may be logically separate yet physically share common circuitry.

In an alternate embodiment, all the functional units may be identical and hence capable of executing any of the operations described herein with respect to the fixed-point unit 220, floating-point unit 230 and vector unit 210.

Figure 2:
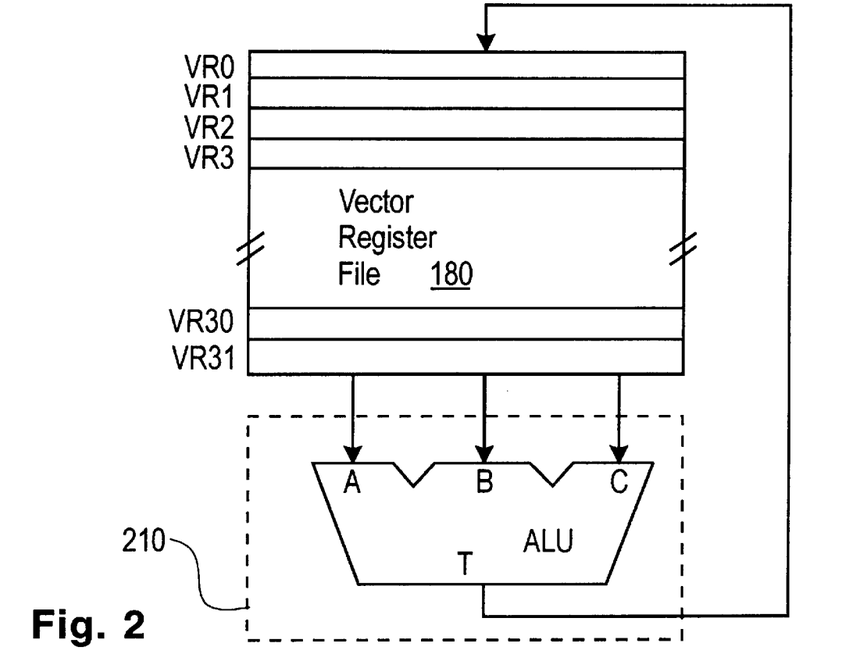
FIG. 2 is a pictorial representation of the vector unit of the processing system of FIG. 1.
Figure 3:
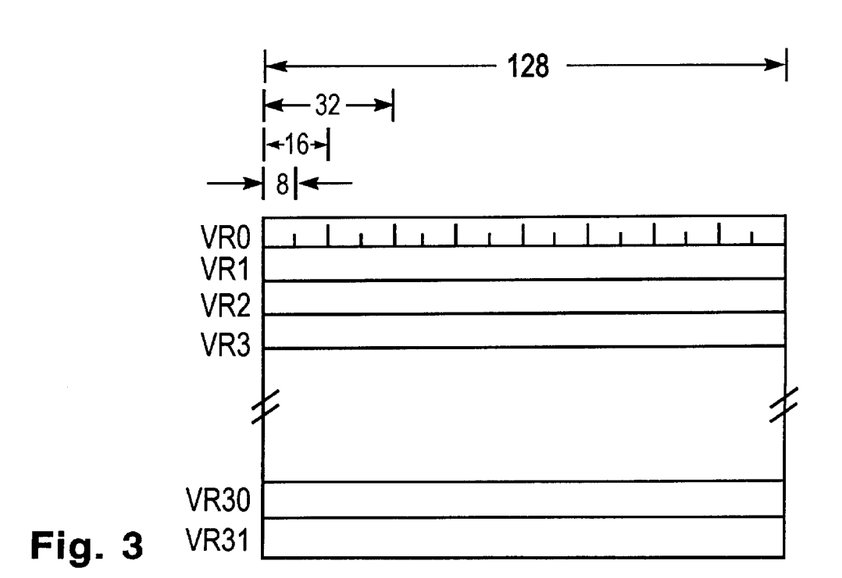
FIG. 3 is pictorial illustration of the vector register file of the vector unit of FIG. 2.

An exemplary implementation of the vector unit 210 and vector register file 180 is shown in FIG. 2. In this implementation, the vector register file 180 includes a set of 32 registers VR0, VR1 . . . VR31 each 128 bits in length. As shown in FIG. 3, each 128-bit register can store 16 8-bit integers, 8 16-bit integers, 4 32-bit integers, or 4 32-bit (single precision) floating point numbers. The vector unit 210 comprises one or more arithmetic logic units (one shown) capable of operating on source vectors read from the vector register file 180 (or other storage means for storing the source vectors) and producing a single result for each architected instruction. For example, the ALU shown in FIG. 2 operates on 3 source vectors supplied to the ALU via ports A,B,C and outputs the result of the architected instruction via port T for storage in the vector register file 180. Preferably, the ALUs are SIMD-style ALUs wherein an instruction performs the same operation on multiple data elements within the source vectors. In addition, the ALU(s) may be logically partitioned based upon the format of data within the source vector(s) for the various vector operations of the architected instructions of the vector unit 210. For example, the ALU(s) shown in FIG. 2 may be logically partitioned into I) 16 ALUs for operating on vectors storing 16 8-bit integers, ii) 8 ALUs for operating on vectors storing 8 16-bit integers, and iii) 4 ALUs for operating on vectors storing 4 32-bit integers and vectors storing 4 32-bit (single precision) floating-point numbers.

The ALUs of the vector unit 210 may be symmetric, wherein each ALU is capable of executing all of the architected instructions of the vector unit 210. In the alternative, the ALUs may be may be asymmetric, where a specific ALU is capable of executing only certain subset of the architected instructions of the vector unit 210. In addition, the ALUs may be pipelined.

According to the present invention, the ALU(s) of the vector unit 210 perform a full multiplication operation (denoted "vmul") whereby data elements from a source vector VX are multiplied to data elements from a source vector VY, and the resultant data elements are stored for subsequent processing. In other words, a full multiplication operation is performed on the data elements of the two source vectors VX,VY, and the resultant data elements are stored for subsequent processing. Preferably, the resultant data elements of the vmul operation are written to a single architected vector register VT. An example of such a vmul operation is represented below:

vmul VT, VX, VY
   do I=0 to 63 in steps of 8
     $(VT)_{I:I+15} \leftarrow (VX)_{I:I+7} * (VY)_{I:I+7}$
   end In this example, 8 data elements (each 8 bits in length) in VX are multiplied with the corresponding 8 data elements (each 8 bits in length) in VY. The 8 results (each 16 bits in length) are written to VT. This operation performs the following operations in parallel:

$(VT)_{0:15} \leftarrow (VX)_{0:7} * (VY)_{0:7}$
$(VT)_{16:31} \leftarrow (VX)_{8:15} * (VY)_{8:15}$
$(VT)_{32:47} \leftarrow (VX)_{16:23} * (VY)_{16:23}$
$(VT)_{48:63} \leftarrow (VX)_{24:31} * (VY)_{24:31}$
$(VT)_{64:79} \leftarrow (VX)_{32:39} * (VY)_{32:39}$
$(VT)_{80:95} \leftarrow (VX)_{40:47} * (VY)_{40:47}$
$(VT)_{96:111} \leftarrow (VX)_{48:55} * (VY)_{48:55}$
$(VT)_{112:127} \leftarrow (VX)_{56:63} * (VY)_{56:63}$ Note that the length of the data elements of VX that form the multiplicands of the vmult operation and the length of data elements of VY that form the multipliers of the vmult operation may be bytes (which is illustrated above), halfwords, words or other binary number of arbitrary length that represent an integer number that may be signed or unsigned. In this case, the appropriate multiplication operation (i.e., signed multiplication or unsigned multiplication) is performed on the multiplicands/multipliers of the source vectors VX, VY.

The present invention utilizes the vmul operation of the ALU(s) of the vector unit 210 as described above to perform a vector multiplication operation. More specifically, a vector multiplication operation is identified whereby two vector source operands VA, VB are multiplied together, and the result VC is stored for subsequent processing. Such a vector multiplication operation has the general form:

VC←VA*VB

Figure 6:
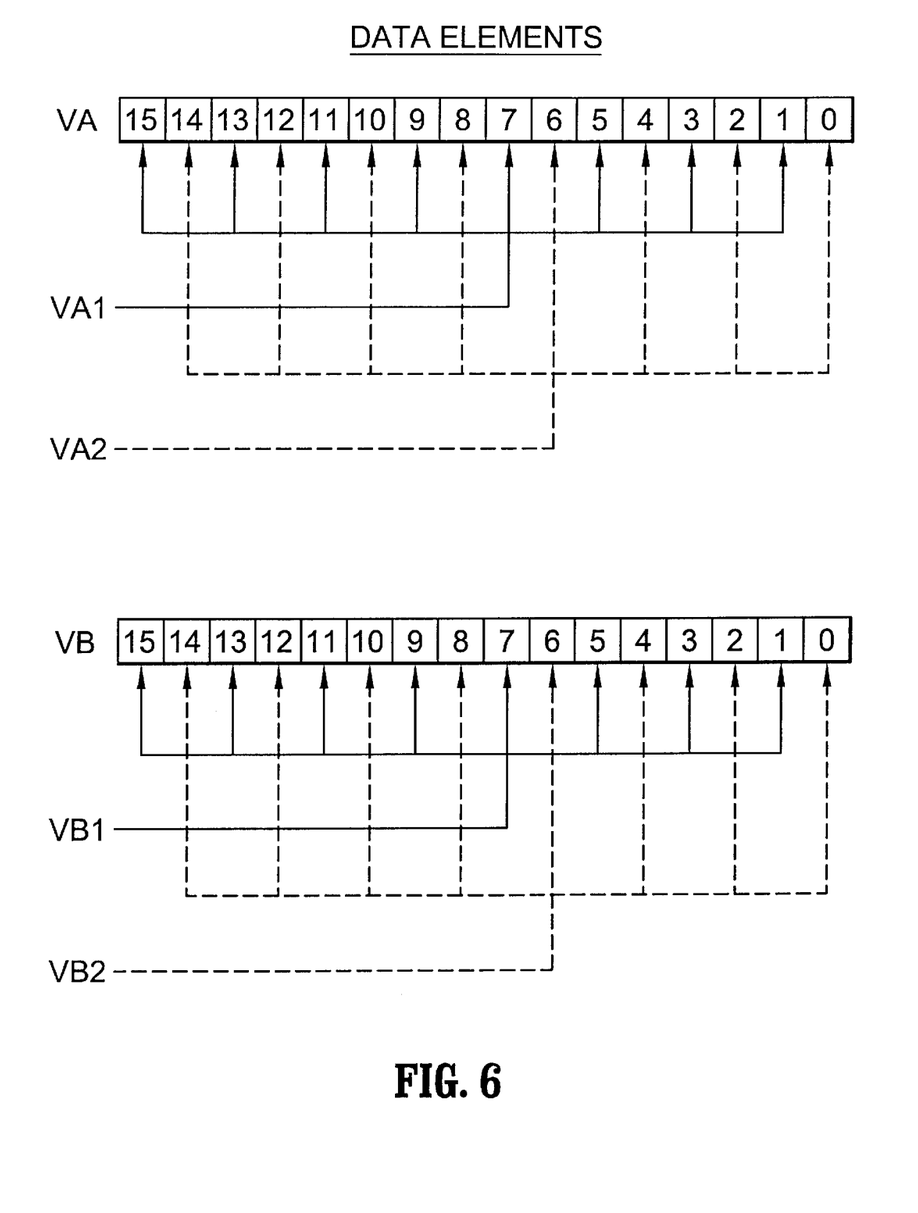
FIG. 6 is a pictorial illustration of odd data elements and even data elements of source vectors.

Referring to FIG. 6, the elements that form the vector source operand VA may be partitioned into two distinct subsets VA1, VA2, where VA1 represents the odd data elements of VA and VA2 represents the even data elements of VA. Similarly, the data elements that form VB may be partitioned into two distinct subsets VB1, VB2, where VB1 represents the odd data elements of VB and VB2 represents the even data elements of VB. The vmult operation is used to multiply the corresponding subsets of the source operands VA and VB. Finally, an operation that merges together the results of the vmult operations is performed to form the resultant vector VC.

Figure 4:
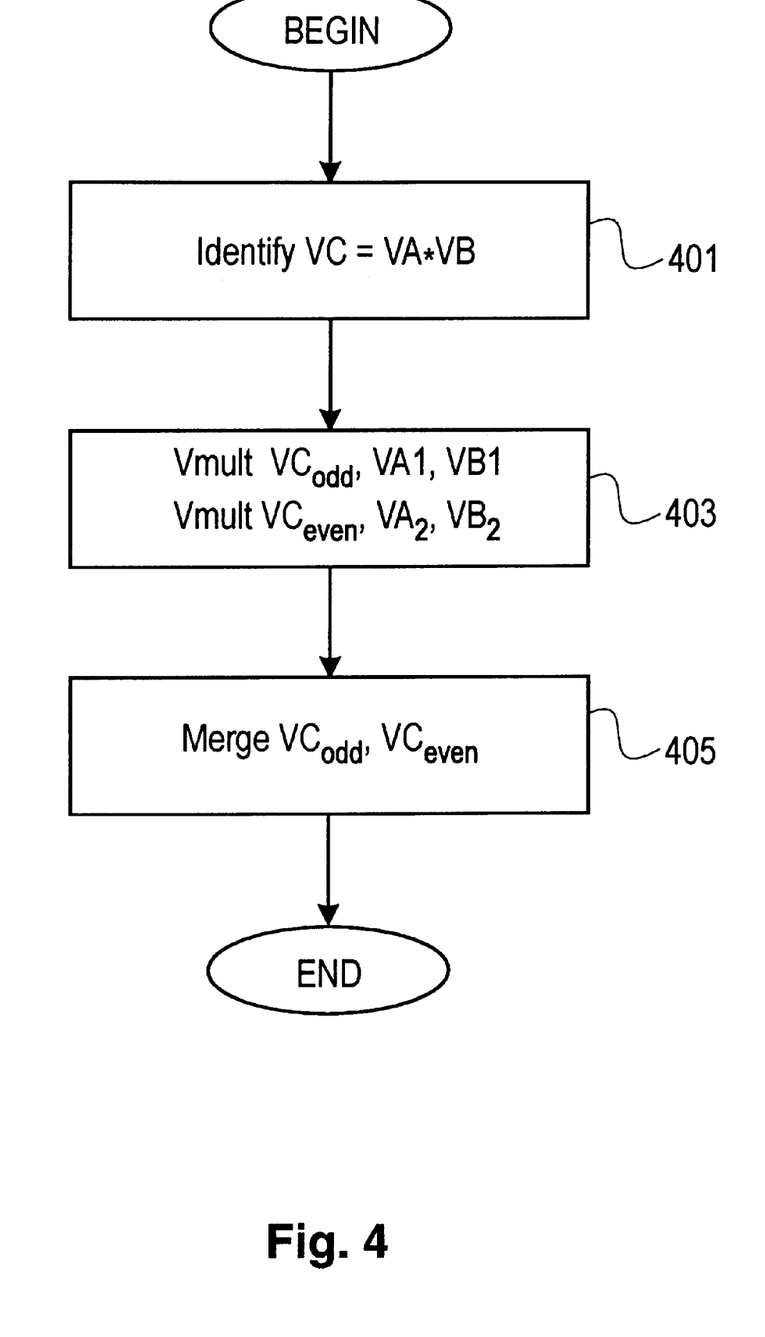
FIG. 4 is a flow chart illustrating operation of the processing system of the present invention.

FIG. 4 is a flow chart illustrating the operations of the present invention. In step 401, a vector multiplication operation is identified whereby two vector source operands VA, VB are multiplied together, and the result VC is stored for subsequent processing. Note that the data elements that form the vector source operand VA may be partitioned into two distinct subsets VA1, VA2, where VA1 represents the odd data elements of VA and VA2 represents the even data elements of VA. Similarly, the data elements that form VB may be partitioned into two distinct subsets VB1, VB2, where VB1 represents the odd data elements of VB and VB2 represents the even data elements of VB.

In step 403, the corresponding subsets of the source operands VA and VB are selected and the vmult operation described above is used to multiply the corresponding subsets of the source operands VA and VB. In the example above, the vmult operation (i.e., vmult VCodd, VA1, VB1) is used to multiply VA1 and VB1, and the resultant vector, denoted VCodd, is stored for subsequent processing. In addition, the vmult operation (i.e., vmult VCeven, VA2, VB2) is used to multiply VA2 and VB2, and the resultant vector, denoted VCeven, is stored for subsequent processing. It should be noted that more than one of the vmult operations performed in step 403 may be performed in parallel if the vector unit 201 has adequate resources to do so.

Figure 5A:
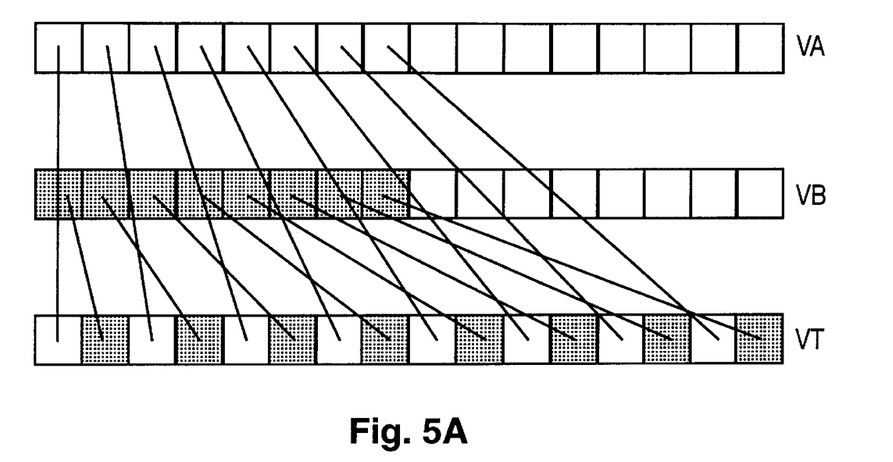
FIGS. 5(A) and (B) is a pictorial illustration of a VectorMergeHigh operation and VectorMergeLow operation of the vector unit of FIG. 2.
Figure 5B:
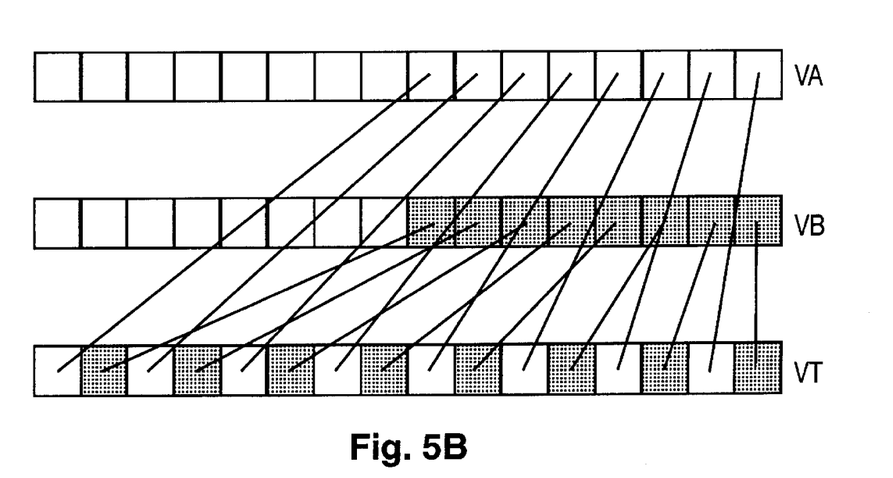

In step 405, an operation that merges together the results of the vmult operations of step 403 is performed, and the resultant data stored for subsequent processing. In the example above, the result vector VC can be represented by 2 distinct portions, $VC_{low}$ and $VC_{high}$, where $VC_{low}$ represents the least significant half of VC and $VC_{high}$ represents the most significant half of VC. $VC_{low}$ may be formed by interleaving the low order elements (the least significant half) of VCeven with the low order elements (least significant half) of VCodd. $VC_{high}$ may be formed by interleaving the high order elements (the most significant half) of VCeven with the high order elements (most significant half) of VCodd. These operations may be performed in parallel if the processor has adequate resources to do so. A graphical example of the interleave operations is illustrated in FIGS. 5(A) and 5(B).

Note that between the vmult operations (step 403) and merge operations (step 405), intermediate operations that use the result of the vmult operations (step 403) may be performed. For example, consider the following series of vector operations:

$$VR = \sum (Vx_i * Vy_i) \text{ where } \sum \text{ sums over } i \text{ ranging from 0 to } (N-1)$$
$$= (Vx_0 * Vy_0) + (Vx_1 * Vy_1) + (Vx_2 * Vy_2) \ldots + (Vx_{N-1} * Vy_{N-1})$$

These operations can be accomplished in two parallel paths (odd elements/even elements) each looping through a series of vmult operations and adding the result of the vmult operation to a running sum as follows:

$VRodd = (Vx_{0,1} * Vy_{0,1}) + (Vx_{1,1} * Vy_{1,1}) + (Vx_{2,1} * Vy_{2,1}) \ldots + (Vx_{N-1,1} * Vy_{N-1,1})$
$VReven = (Vx_{0,2} * Vy_{0,2}) + (Vx_{1,2} * Vy_{1,2}) + (Vx_{2,2} * Vy_{2,2}) \ldots + (Vx_{N-1,2} * Vy_{N-1,2})$ where the odd elements of vector $Vx_i$ are denoted $Vx_{i,1}$,
where the odd elements of vector $Vy_i$ are denoted $Vy_{i,1}$,
where the even elements of vector $Vx_i$ are denoted $Vx_{i,2}$, and
where the even elements of vector $Vy_i$ are denoted $Vy_{i,2}$.

In this example, after the two paths of vmult operations/additions are complete, the running sum from the two paths are merged together as described above in step 405, and the resultant data stored for subsequent processing.

Portions of the functionality described above may be part of a compilation software routine that transforms code from a source form to a target form. For example, the compilation software routine may be a compiler that transforms human readable source code to an executable form. The compilation software routine may also be a dynamic compilation routine (such as a post-compilation optimization routine, a Java Virtual Machine or Windows NT HAL layer) that performs transformations on executable code. In the alternative, portions of the functionality described above may be performed by logic.

In the preferred embodiment of the present invention, the instruction set architecture of the vector unit 201 includes a vmulteven instruction and a vmultodd instruction. For the vmulteven instruction, even data elements from a source vector VX are multiplied to even data elements from a source vector VY, and the resultant data elements are stored for subsequent processing. Preferably, the data elements of the source vector VX and source vector VY of the vmulteven instruction are read from architected vector registers, and the resultant data elements written to a single architected vector register VT. An example of such a vmulteven instruction is represented below:

vmulteven VT, VX, VY
   do I=0 to 127 in steps of 16
      $(VZ)_{I:I+15} \leftarrow (VX)_{I:I+7}{}^{*}(VY)_{I:I+7}$
   end In this example, 8 even data elements (each 8 bits in length) in VX are multiplied with the corresponding 8 even data elements (each 8 bits in length) in VY. The 8 results (each 16 bits in length) are written to VT. This operation performs the following operations in parallel:

$(VT)_{0:15} \leftarrow (VX)_{0:7}{}^{*}(VY)_{0:7}$
$(VT)_{16:31} \leftarrow (VX)_{16:23}{}^{*}(VY)_{16:23}$
$(VT)_{32:47} \leftarrow (VX)_{32:39}{}^{*}(VY)_{32:39}$
$(VT)_{48:63} \leftarrow (VX)_{48:55}{}^{*}(VY)_{48:55}$
$(VT)_{64:79} \leftarrow (VX)_{64:71}{}^{*}(VY)_{64:71}$
$(VT)_{80:95} \leftarrow (VX)_{80:87}{}^{*}(VY)_{80:87}$
$(VT)_{96:111} \leftarrow (VX)_{96:103}{}^{*}(VY)_{96:103}$
$(VT)_{112:127} \leftarrow (VX)_{112:119}{}^{*}(VY)_{112:119}$ For the vmultodd instruction, odd data elements from a source vector VX are multiplied to odd data elements from a source vector VY, and the resultant data elements are stored for subsequent processing. Preferably, the data elements of the source vector VX and source vector VY of the vmultodd instruction are read from architected vector registers, and the resultant data elements written to a single architected vector register VT. An example of such a vmultodd instruction is represented below:

vmultodd VT, VX, VY
   do I=0 to 127 in steps of 16
      $(VZ)_{I:I+15} \leftarrow (VX)_{I+8:I+15}{}^{*}(VY)_{I+8:I+15}$
   end In this example, 8 odd data elements (each 8 bits in length) in VX are multiplied with the corresponding 8 odd data elements (each 8 bits in length) in VY. The 8 results (each 16 bits in length) are written to VT. This operation performs the following operations in parallel:

$(VT)_{0:15} \leftarrow (VX)_{8:15}{}^{*}(VY)_{8:15}$
$(VT)_{16:31} \leftarrow (VX)_{24:31}{}^{*}(VY)_{24:31}$
$(VT)_{32:47} \leftarrow (VX)_{40:47}{}^{*}(VY)_{40:47}$
$(VT)_{48:63} \leftarrow (VX)_{56:63}{}^{*}(VY)_{56:63}$
$(VT)_{64:79} \leftarrow (VX)_{72:79}{}^{*}(VY)_{72:79}$
$(VT)_{80:95} \leftarrow (VX)_{88:95}{}^{*}(VY)_{88:95}$
$(VT)_{96:111} \leftarrow (VX)_{104:111}{}^{*}(VY)_{104:111}$
$(VT)_{112:127} \leftarrow (VX)_{120:127}{}^{*}(VY)_{120:127}$ In addition, the instruction set architecture of the vector unit 201 preferably includes a VectorMergeHigh instruction and VectorMergeLow instruction. The VectorMergeHigh instruction interleaves the high order data elements (most significant half) of a source operand vector VA with the high order data elements (most significant half) of a source operand vector VB, and stores the resultant data elements for subsequent processing. Preferably, the data elements of the source vector VA and source vector VB of the VectorMergeHigh instruction are read from architected vector registers, and the resultant data elements written to a single architected vector register VT. An example of the VectorMergeHigh instruction follows:

VectorMergeHigh VT,VA,VB
   do I=0 to 63 in steps of 8
      $(VT)_{I*2:I*2+15} \leftarrow (VA)_{I:I+7} \| (VB)_{I:I+7}$
   end This operation performs the following operations in parallel:

$(VT)_{0:15} \leftarrow (VA)_{0:7} \| (VB)_{0:7}$
$(VT)_{16:31} \leftarrow (VA)_{8:15} \| (VB)_{8:15}$
$(VT)_{32:47} \leftarrow (VA)_{16:23} \| (VB)_{16:23}$
$(VT)_{48:63} \leftarrow (VA)_{24:31} \| (VB)_{24:31}$
$(VT)_{64:79} \leftarrow (VA)_{32:39} \| (VB)_{32:39}$
$(VT)_{80:95} \leftarrow (VA)_{40:47} \| (VB)_{40:47}$
$(VT)_{96:111} \leftarrow (VA)_{48:55} \| (VB)_{48:55}$
$(VT)_{112:127} \leftarrow (VA)_{56:63} \| (VB)_{56:63}$ A pictorial illustration of the VectorMergeHigh instruction is illustrated in FIG. 5(A).

The VectorMergeLow instruction interleaves the low order data elements (least significant half) of a source operand vector VA with the low order data elements (least significant half) of a source operand vector VB, and stores the resultant data elements for subsequent processing. Preferably, the data elements of the source vector VA and source vector VB of the VectorMergeLow instruction are read from architected vector registers, and the resultant data elements written to a single architected vector register VT. An example of the VectorMergeLow instruction follows:

VectorMergeLow VT,VA,VB
   do I=0 to 63 in steps of 8
      $(VT)_{I*2:I*2+15} \leftarrow (VA)_{I+64:I+71} \| (VB)_{I+64:I+71}$
   end This operation performs the following operations in parallel:

$(VT)_{0:15} \leftarrow (VA)_{64:71} \| (VB)_{64:71}$
$(VT)_{16:31} \leftarrow (VA)_{72:79} \| (VB)_{72:79}$
$(VT)_{32:47} \leftarrow (VA)_{80:87} \| (VB)_{80:87}$
$(VT)_{48:63} \leftarrow (VA)_{88:95} \| (VB)_{88:95}$
$(VT)_{64:79} \leftarrow (VA)_{96:103} \| (VB)_{96:103}$
$(VT)_{80:95} \leftarrow (VA)_{104:111} \| (VB)_{104:111}$
$(VT)_{96:111} \leftarrow (VA)_{112:119} \| (VB)_{112\ 119}$
$(VT)_{112:127} \leftarrow (VA)_{120:127} \| (VB)_{120:127}$ A pictorial illustration of the VectorMergeLow instruction is illustrated in FIG. 5(B).

Note that the length of data elements of the vmulteven, vmultodd, VectorMergeHigh, and VectorMergeLow instructions may be a byte (which is illustrated above), halfword, word or other binary number of arbitrary length that represent an integer number that may be signed or unsigned. In this case, for the vmulteven and vmultodd instructions, the appropriate multiplication operation (i.e., signed multiplication or unsigned multiplication) is performed on the multiplicands/multipliers of the source vectors VX, VY.

In the preferred embodiment, portions of the operations of steps 401, 403 and 405 of FIG. 4 are performed as part of a compilation software routine (for example, part of a compiler, or as part of a dynamic compilation routine, as described above). In step 401, the compilation routine identifies a vector multiplication operation whereby two vector source operands VA, VB are multiplied together, and the result VC is stored for subsequent processing. In step 403, the compilation routine generates a vmulteven instruction (i.e., vmulteven VCeven, VA, VB) that multiplies the even data elements of VA and VB and stores the resultant vector VCeven for subsequent processing. In addition, the compilation routine generates a vmultodd instruction (i.e., vmultodd VCodd, VA, VB) that multiplies the odd data elements of VA and VB and stores the resultant vector VCodd for subsequent processing. The compilation routine stores the vmulteven and vmultodd instructions as part of a sequence of instructions that are to be executed by the processing system. In step 405, the compilation routine generates a VectorMergeHigh instruction that interleaves the high order elements (most significant half) of vector VCeven with the high order elements (most significant half) of vector VCodd, stores the resultant vector VCH for subsequent processing. In addition, the compilation routine generates a VectorMergeLow instruction that interleaves the low order elements (least significant half) of vector VCeven with the low order elements (least significant half) of vector VCodd, stores the resultant vector VCL for subsequent processing. The compilation routine stores the VectorMergeHigh and VectorMergeLow instructions as part of the sequence of instructions that are to be executed by the processing system. During execution of this sequence of instructions, the vector unit(s) 201 of the processing system executes the vmulteven, vmultodd, VectorMergeHigh, and VectorMergeLow instructions that are part of this sequence of instructions.

In addition, the compilation routine may search for series of vector operations that can be performed in two parallel paths (odd elements/even elements). In this case, the compilation routine generates a corresponding series of vmulteven, vmultodd instructions and intermediate instructions that perform each path of the series of vector operations. The compilation routine also generates a set of VectorMergeHigh and VectorMergeLow instructions that merges the results of the two paths as described above in step 405. The compilation routine stores the series of instructions and merge instructions as part of the sequence of instructions that are to be executed by the processing system. During execution of this sequence of instructions, the vector unit(s) 201 of the processing system executes this series of instructions.

For example, consider the series of vector operations described above:

$$VR = \sum (Vx_i * Vy_i) \text{ where } \sum \text{ sums over } i \text{ ranging from 0 to } (N-1)$$
$$= (Vx_0 * Vy_0) + (Vx_1 * Vy_1) + (Vx_2 * Vy_2) \ldots + (Vx_{N-1} * Vy_{N-1})$$

These operations can be accomplished in two parallel paths (odd elements/even elements) as follows:

$VRodd = (Vx_{0,1} * Vy_{0,1}) + (Vx_{1,1} * Vy_{1,1}) + (Vx_{2,1} * Vy_{2,1}) \ldots + (Vx_{N-1,1} * Vy_{N-1,1})$ $VReven = (Vx_{0,2} * Vy_{0,2}) + (Vx_{1,2} * Vy_{1,2}) + (Vx_{2,2} * Vy_{2,2}) \ldots + (Vx_{N-1,2} * Vy_{N-1,2})$ where the odd elements of vector $Vx_i$ are denoted $Vx_{i,1}$, where the odd elements of vector $Vy_i$ are denoted $Vy_{i,1}$, where the even elements of vector $Vx_i$ are denoted $Vx_{i,2}$, and where the even elements of vector $Vy_i$ are denoted $Vy_{i,2}$.

After the two paths are complete, the running sum from the two paths are merged together as described above in step 405.

For this example, the compilation routine may generate the following series of instructions to perform the two paths and merge operation:

EVEN PATH

VReven=0;

VRetemp=0;

vmulteven (VRetemp,$Vx_{0,2}$, $Vy_{0,2}$)

VReven=VReven+VRetemp vmulteven (VRetemp, $Vx_{1,2}$, $Vy_{1,2}$)

VReven=VReven+VRetemp vmulteven (VRetemp, $Vx_{2,2}$, $Vy_{2,2}$)

VReven=VReven+VRetemp

. . .

vmulteven (VRetemp, $Vx_{N-1,2} * Vy_{N-1,2}$)

VReven=VReven+VRetemp

ODD PATH

Vrodd=0;

VRotemp=0;

vmultodd (VRotemp,$Vx_{0,1}$, $Vy_{0,1}$)

VRodd=VRodd+VRotemp vmultodd (VRotemp, $Vx_{1,1}$, $Vy_{1,1}$)

VRodd=VRodd+VRotemp vmultodd (VRotemp, $Vx_{2,1}$, $Vy_{2,1}$)

VRodd=VRodd+VRotemp

. . .

vmultodd (VRotemp, $Vx_{N-1,1} * Vy_{N-1,1}$)

VRodd=VRodd+VRotemp

MERGE

VectorMergeHigh VCH, VReven, VRodd

VectorMergeLow VCL, VReven, VRodd

It should be noted that this series of instructions may be modified such that multiple instructions are performed in parallel if the vector unit 201 has adequate resources to do so.

The compilation routine stores this series of instructions as part of the sequence of instructions that are to be executed by the processing system. During execution of this sequence of instructions, the processing system executes the sequence of instructions.

Advantageously, the vector multiplication mechanism of the present invention preferably uses general purpose registers to store the results of the vector multiplication operation. This provides freedom in the number of vector multiplication operations that can be concurrently performed by the processing system, and, thus, solves a fundamental problem of Accumulator-based implementations.

Morever, the vector multiplication mechanism of the present invention preferably uses a single register to store the results of the even and odd vector multiplication operations. This avoids complicating the run-time dispatch operation (i.e., register renaming operation) of instructions, and, thus, solves a fundamental problem of Register-pair destination implementations.

Finally, it should be noted that there is computational overhead in merging together the results of the even and odd vector multiplication operations of the present invention. However, in practice, this overhead will preferably be amortized over a series of vector operations. An example of such a series of vector operations is discussed above where:

$$VR = \sum (Vx_i * Vy_i) \text{ where } \sum \text{ sums over } i \text{ ranging from } 0 \text{ to } (N-1)$$
$$= (Vx_0 * Vy_0) + (Vx_1 * Vy_1) + (Vx_2 * Vy_2) \ldots + (Vx_{N-1} * Vy_{N-1})$$

In such instances, it is clear the computational overhead of the vector multiplication operations of the present invention is significantly less than implementations that perform vector multiplication operation utilizing partial multiplication.

Although the invention has been shown and described with respect to the particular embodiments thereof, it should be understood by those skilled in the art that the foregoing and various other changes, omissions, and additions in the form and detail thereof may be made without departing from the spirit and scope of the invention.

We claim:

1. In a computer processing system comprising memory storing first and second source vectors each comprising a plurality of data elements, a method for performing vector multiplication operation comprising the steps of:
   reading said first source vector from said memory, and selecting odd data elements and even data elements of said first source vector;
   reading said second source vector from said memory, and selecting odd data elements and even data elements of said second source vector;
   performing multiplication operation between each of selected odd data elements of said first source vector and corresponding one of selected odd data elements of said second source vector, and storing resultant data in said memory for subsequent processing; and
   performing multiplication operation between each of selected even data elements of said first source vector and corresponding one of selected even data elements of said second source vector, and storing resultant data in said memory for subsequent processing.

2. The method of claim 1, wherein said memory comprises a register file including at least one register that stores said first source vector and at least one register that stores said second source vector.

3. The method of claim 2, wherein said register file is architecturally visible.

4. The method of claim 2, wherein said resultant data is stored in at least one register in said register file.

5. The method of claim 4, wherein said register file is architecturally visible, and wherein said resultant data is stored in a single register in said register file.

6. The method of claim 1, wherein said data elements of said first source vector each represent an integer, and length of said data elements of said first source vector is one of a byte, halfword, and word.

7. The method of claim 1, wherein said data elements of said second source vector each represent an integer, and length of said data elements of said second source vector is one of a byte, halfword, and word.

8. In a computer processing system comprising memory storing first and second source vectors each comprising a plurality of data elements, an apparatus for performing vector multiplication operation, comprising:
   means, coupled to said memory, for reading said first source vector from said memory, and selecting odd data elements and even data elements of said first source vector;
   means, coupled to said memory, for reading said second source vector from said memory, and selecting odd data elements and even data elements of said second source vector;
   means for performing multiplication operation between each of selected odd data elements of said first source vector and corresponding one of selected odd data elements of said second source vector, and storing resultant data in said memory for subsequent processing, and
   means for performing multiplication operation between each of selected even data elements of said first source vector and corresponding one of selected even data elements of said second source vector, and storing resultant data in said memory for subsequent processing.

9. The apparatus of claim 8, wherein said memory comprises a register file including at least one register that stores said first source vector and at least one register that stores said second source vector.

10. The apparatus of claim 9, wherein said register file is architecturally visible.

11. The apparatus of claim 9, wherein said resultant data is stored in at least one register in said register file.

12. The apparatus of claim 11, wherein said register file is architecturally visible, and wherein said resultant data is stored in a single register in said register file.

13. The apparatus of claim 8, wherein said data elements of said first source vector each represent an integer, and length of said data elements of said first source vector is one of a byte, halfword, and word.

14. The apparatus of claim 8, wherein said data elements of said second source vector each represent an integer, and length of said data elements of said second source vector is one of a byte, halfword, and word.

15. In a computer processing system wherein a first memory stores source instructions that encode vector multiplication operation whereby data elements of a first source vector are multiplied by data elements of a second source vector, a method for transforming said source instructions comprising the steps of:
   generating a first target instruction for odd data elements of said first and second source vectors, that encodes the following operations: reading said first source vector from a second memory, selecting odd data elements of said first source vector, reading said second source vector from said second memory, selecting odd data elements of said second source vector, performing multiplication operation between each of selected odd data elements of said first source vector and corresponding one of selected odd data elements of said second source vector, and storing resultant data in said second memory for subsequent processing;
   generating a second target instruction for even data elements of said first and second source vectors, that encodes the following operations: reading said first source vector from said second memory, selecting even data elements of said first source vector, reading said second source vector from said second memory, selecting even data elements of said second source vector, performing multiplication operation between each of selected even date elements of said first source vector and corresponding one of selected even data elements of said second source vector, and storing resultant data in said second memory for subsequent processing; and storing said first and second target instructions for subsequent execution.

16. The method of claim 15, further comprising:

generating a third target instruction that merges together elements of said resultant data of said first target instruction and elements of said resultant data of said second target instruction, and storing resultant data of said third target instruction in said second memory for subsequent processing; and storing said their target instruction for subsequent execution.

17. The method of claim 15, wherein said method is part of a compilation routine.

18. The method of claim 17, wherein said compilation routine is a compiler.

19. The method of claim 17, wherein said compilation routine is a dynamic compilation routine.

20. The method of claim 17, wherein portions of said compilation routine are implemented by logic.

21. The method of claim 15, wherein said data elements of said first source vector each represent an integer, and length of said data elements of said first source vector is one of a byte, halfword, and word.

22. The method of claim 15, wherein said data elements of said second source vector each represent an integer, and length of said data elements of said second source vector is one of a byte, halfword, and word.

23. In a computer processing system wherein a first memory stores source instructions that encode vector multiplication operation whereby data elements of a first source vector are multiplied by data elements of a second source vector, an apparatus for transforming said source instructions comprising the steps of:

means for generating a first target instruction for odd data elements of said first and second source vectors, that encodes the following operations: reading said first source vector from a second memory, selecting odd data elements of said first source vector, reading said second source vector from said second memory, selecting odd data elements of said second source vector, performing multiplication operation between each of selected odd data elements of said first source vector and corresponding one of selected odd data elements of said second source vector, and storing resultant data in said second memory for subsequent processing;

means for generating a second target instruction for even data elements of said first and second source vectors, that encodes the following operations: reading said first source vector from said second memory, selecting even data elements of said first source vector, reading said second source vector from said second memory, selecting even data elements of said second source vector, performing multiplication operation between each of selected even data elements of said first source vector and corresponding one of selected even data elements of said second source vector, and storing resultant data in said second memory for subsequent processing; and means for storing said first and second target instructions for subsequent execution.

24. The apparatus of claim 23, further comprising:

means for generating a third target instruction that merges together elements of said resultant data of said first target instruction and elements of said resultant data of said second target instruction, and storing resultant data of said third target instruction in said second memory for subsequent processing; and means for storing said third target instruction for subsequent execution.

25. The apparatus of claim 23, wherein said apparatus is part of a compilation routine.

26. The apparatus of claim 25, wherein said apparatus is a compiler.

27. The apparatus of claim 25, wherein said compilation routine is a dynamic compilation routine.

28. The apparatus of claim 25, wherein portions of said compilation routine are implemented by logic.

29. The apparatus of claim 23, wherein said data elements of said first source vector each represent an integer, and length of said data elements of said first source vector is one of a byte, halfword, and word.

30. The apparatus of claim 23, wherein said data elements of said second source vector each represent an integer, and length of said data elements of said second source vector is one of a byte, halfword, and word.

31. In a computer processing system wherein a first memory stores instructions that encode a series of vector operations that can be partitioned into an odd path and an even path, wherein vector operations belonging to said odd path perform operations on odd data elements of source vectors, and wherein vector operations belonging to said even path perform operations on even data elements of source vectors, a method for transforming said series of instructions comprising the steps of:

generating a first set of target instructions for said odd path, wherein at least one target instruction belonging to said first set encodes the following operations: reading a first source vector from a second memory, selecting odd data elements of said first source vector, reading a second source vector from said second memory, selecting odd data elements of said second source vector, performing operation between each of selected odd data elements of said first source vector and corresponding one of selected odd data elements of said second source vector, and storing resultant data in said second memory for subsequent processing;

generating a second set of target instructions for said even path, wherein at least one target instruction belonging to said second set encodes the following operations: reading said first source vector from said second memory, selecting even data elements of said first source vector, reading said second source vector from said second memory, selecting even data elements of said second source vector, performing operation between each of selected even data elements of said first source vector and corresponding one of selected even data elements of said second source vector, and storing resultant data in said second memory for subsequent processing; and storing said first and second set of target instructions for subsequent execution.

32. The method of claim 31, wherein said at least one target instruction belonging to said first set encodes full multiplication operation between each of selected odd data elements of said first source vector and said second source vector, and said at least one target instruction belonging to said second set encodes full multiplication operation between said selected even data elements of said first source vector and said second source vector.

33. The method of claim 31, further comprising:
generating a merge target instruction that merges together elements of said resultant data of said first set of target instructions and elements of said resultant data of said second set of target instructions and storing resultant data of said merge target instruction in said second memory for subsequent processing; and
storing said merge target instruction for subsequent execution.

34. The method of claim 31, wherein said method is part of a compilation routine.

35. The method of claim 34, wherein said compilation routine is a compiler.

36. The method of claim 34, wherein said compilation routine is a dynamic compilation routine.

37. The method of claim 34, wherein portions of said compilation routine are implemented by logic.

38. The method of claim 31, wherein said data elements of said first source vector each represent an integer, and length of said data elements of said first source vector is one of a byte, halfword, and word.

39. The method of claim 31, wherein said data elements of said second source vector each represent an integer, and length of said data elements of said second source vector is one of a byte, halfword, and word.

40. In a computer processing system wherein a first memory stores instructions that encode a series of vector operations that can be partitioned into an odd path and an even path, wherein vector operations belonging to said odd path perform operations on odd data elements of source vectors, and wherein vector operations belonging to said even path perform operations on even data elements of source vectors, an apparatus for transforming said series of instructions comprising the steps of:
means for generating a first set of target instructions for said odd path, wherein at least one target instruction belonging to said first set encodes the following operations: reading a first source vector from a second memory, selecting odd data elements of said first source vector, reading a second source vector from said second memory, selecting odd data elements of said second source vector, performing operation between each of selected odd data elements of said first source vector and corresponding one of selected odd data elements of said second source vector, and storing resultant data in said second memory for subsequent processing;
means for generating a second set of target instructions for said even path, wherein at least one target instruction belonging to second set encodes the following operations: reading said first source vector from said second memory, selecting even data elements of said first source vector, reading said second source vector from said second memory, selecting even data elements of said second source vector, performing operation between each of selected even data elements of said first source vector and corresponding one of selected even data elements of said second source vector, and storing resultant data in said second memory for subsequent processing; and
means for storing said first and second set of target instructions for subsequent execution.

41. The apparatus of claim 40, wherein said at least one target instruction belonging to aid first set encodes full multiplication operation between each of selected odd data elements of said first source vector and said second source vector, and said at least one target instruction belonging to said second set encodes full multiplication operation between said selected even data elements of said first source vector and said second source vector.

42. The apparatus of claim 40, further comprising:
means for generating a merge target instruction that merges together elements of said resultant data of said first set of target instructions and elements of said resultant data of said second set of target instructions and storing resultant data of said merge target instruction in said second memory for subsequent processing; and
storing said merge target instruction for subsequent execution.

43. The apparatus of claim 40, wherein said apparatus is part of a compilation routine.

44. The apparatus of claim 43, wherein said compilation routine is a compiler.

45. The apparatus of claim 43, wherein said compilation routine is a dynamic compilation routine.

46. The apparatus of claim 43, wherein portions of said compilation routine are implemented by logic.

47. The apparatus of claim 40, wherein said data elements of said first source vector each represent an integer, and length of said data elements of said first source vector is one of a byte, halfword, and word.

48. The apparatus of claim 31, wherein said data elements of said second source vector each represent an integer, and length of said data elements of said second source vector is one of a byte, halfword, and word.

* * * * *